(12) United States Patent
Al-Qahtani et al.

(10) Patent No.: US 8,539,820 B2
(45) Date of Patent: Sep. 24, 2013

(54) ACOUSTIC LEAK DETECTION SYSTEM AND METHOD WITH ENVIROMENTAL NOISE ISOLATION

(75) Inventors: Hussain M. Al-Qahtani, Dhahran (SA); Muhammad A. Hawwa, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 403 days.

(21) Appl. No.: 12/917,238

(22) Filed: Nov. 1, 2010

(65) Prior Publication Data
US 2012/0103069 A1    May 3, 2012

(51) Int. Cl.
*G01M 3/18*    (2006.01)

(52) U.S. Cl.
USPC ........................................ 73/40.5 A; 73/592

(58) Field of Classification Search
USPC .............................. 73/40.5 A, 592
See application file for complete search history.

(56) References Cited

U.S. PATENT DOCUMENTS

| | | | |
|---|---|---|---|
| 3,930,556 A * | 1/1976 | Kusuda et al. | 73/40.5 A |
| 4,996,879 A | 3/1991 | Kruka et al. | |
| 5,269,568 A | 12/1993 | Courturier | |
| 5,315,291 A | 5/1994 | Furr | |
| 5,675,506 A | 10/1997 | Savic | |
| 5,920,265 A | 7/1999 | Johnson, Jr. et al. | |
| 5,974,862 A | 11/1999 | Lander et al. | |
| 6,073,481 A * | 6/2000 | Barefoot | 73/49.5 |
| 6,530,263 B1 | 3/2003 | Chana | |
| 6,672,139 B2 | 1/2004 | Pampinella | |
| 6,725,705 B1 | 4/2004 | Huebler et al. | |
| 6,912,890 B2 | 7/2005 | Brewer | |
| 7,178,385 B2 | 2/2007 | McCoy et al. | |
| 7,266,992 B2 | 9/2007 | Shamout et al. | |
| 7,281,411 B2 | 10/2007 | Brewer | |
| 7,325,442 B1 | 2/2008 | Pampinella et al. | |
| 2002/0124633 A1 | 9/2002 | Yang et al. | |
| 2002/0134140 A1 | 9/2002 | Baumoel | |
| 2003/0167847 A1 | 9/2003 | Brown et al. | |
| 2004/0128034 A1 | 7/2004 | Lenker et al. | |
| 2006/0174707 A1 | 8/2006 | Zhang | |
| 2008/0136203 A1 * | 6/2008 | Krijnen et al. | 294/91 |
| 2009/0255345 A1 * | 10/2009 | Gysling | 73/861.25 |

FOREIGN PATENT DOCUMENTS

WO    WO 2004031719    4/2004

* cited by examiner

*Primary Examiner* — Hezron E Williams
*Assistant Examiner* — Paul West
(74) *Attorney, Agent, or Firm* — Richard C. Litman

(57) ABSTRACT

The acoustic leak detection system with environmental noise isolation provides for the acoustic detection of leaks in a pipe while minimizing interference from external or environmental noise. The acoustic leak detection system includes a hollow shell adapted for positioning about the pipe to be inspected. A pair of gaskets are circumferentially secured to the inner surface of the hollow shell so that the pair of gaskets bear against the outer surface of the pipe to form an acoustically isolated region defined between the pipe, the pair of gaskets and the inner surface of the hollow shell. An acoustic sensor, microphone or the like is mounted on the hollow shell within the acoustically isolated region for detecting any acoustic signals; i.e., the sound produced by a leak in the pipe within the acoustically isolated region. Upon detection of a leak, an alert signal is generated.

13 Claims, 4 Drawing Sheets

ACOUSTIC LEAK DETECTION SYSTEM AND METHOD WITH ENVIROMENTAL NOISE ISOLATION

BACKGROUND OF THE INVENTION

1. Field of the Invention

The present invention relates generally to pipes for transporting fluids, such as water, gas, chemical fluid and the like, and particularly to an acoustic leak detection system and method with environmental noise isolation, applicable to pipes and couplings, that generates an alert signal when a liquid leak from a pipe joint or coupling is detected.

2. Description of the Related Art

Pipelines suffer from leakage due to excess fluid pressure, corrosion caused by reactions with moving fluid or a surrounding medium, cracks due to aging, poor construction, poor maintenance or the like. Pipeline leakage may present serious environmental and economic problems. Thus, leaks should be quickly detected, located and repaired.

Typical conventional pipeline leak detection systems are relatively inefficient in terms of response time, sensitivity, robustness and cost. Pipeline leaks are typically detected by observation of the external effects of the spill, or by monitoring and analysis of the internal hydraulics of the pipeline. Neither of these methods provides real-time monitoring of the leak itself, only the indirect effects of a leak. One of the objectives of a pipeline leak detection system is to alert operators so that the size of the spill can be limited.

A wide variety of methods of leak detection are known, such as ultrasonic, electromagnetic, optical fiber, and acoustic-based methods. Typical acoustic detection methods suffer from location in noisy environments, i.e., pipeline networks are often located in or near industrial environments, traffic roads, subways, airports or the like. In such noisy environments, acoustic noise generated by the leak is often masked by background noise, particularly at the early stage of leakage when the acoustic signal of the leak is weakest. In such circumstances, the leak signal to noise ratio becomes considerably small.

It thus becomes necessary to isolate the acoustic signal generated by the leak from external or environmental noise. Thus, an acoustic leak detection system and method with environmental noise isolation solving the aforementioned problems is desired.

SUMMARY OF THE INVENTION

The acoustic leak detection system and method with environmental noise isolation provides for the acoustic detection of leaks in a pipe while minimizing interference from external or environmental noise. The acoustic leak detection system includes a hollow shell adapted for positioning about the pipe to be inspected. The hollow shell preferably has first and second portions releasably secured to one another. The first and second portions forming the hollow shell are preferably formed from an acoustically insulating material.

A pair of gaskets are circumferentially secured to an inner surface of the hollow shell. The pair of gaskets are spaced apart from one another so that the pair of gaskets contact an outer surface of the pipe to form an acoustically isolated region defined between the outer surface of the pipe, the pair of gaskets and the inner surface of the hollow shell. An acoustic sensor, microphone or the like is mounted to the hollow shell within the acoustically isolated region for detecting any acoustic signals, i.e., the sound produced by a leak in the pipe within the acoustically isolated region. The acoustically isolated region may be defined about a pipe joint or another area of interest that is known to be susceptible to leakage.

Following detection of the acoustic signal within the acoustically isolated region, the acoustic signal is analyzed. The acoustic signal may be recorded and compared against a database of known acoustic signals that match leakages, indicating the presence of a leak and its severity. Alternatively, the intensity of the acoustic signal may be measured. If the intensity exceeds a threshold value, the acoustic signal then indicates the presence of the leak, and the intensity indicates its severity. Upon determination of the leak, an alert signal is generated, which may be visual, audible or the like.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
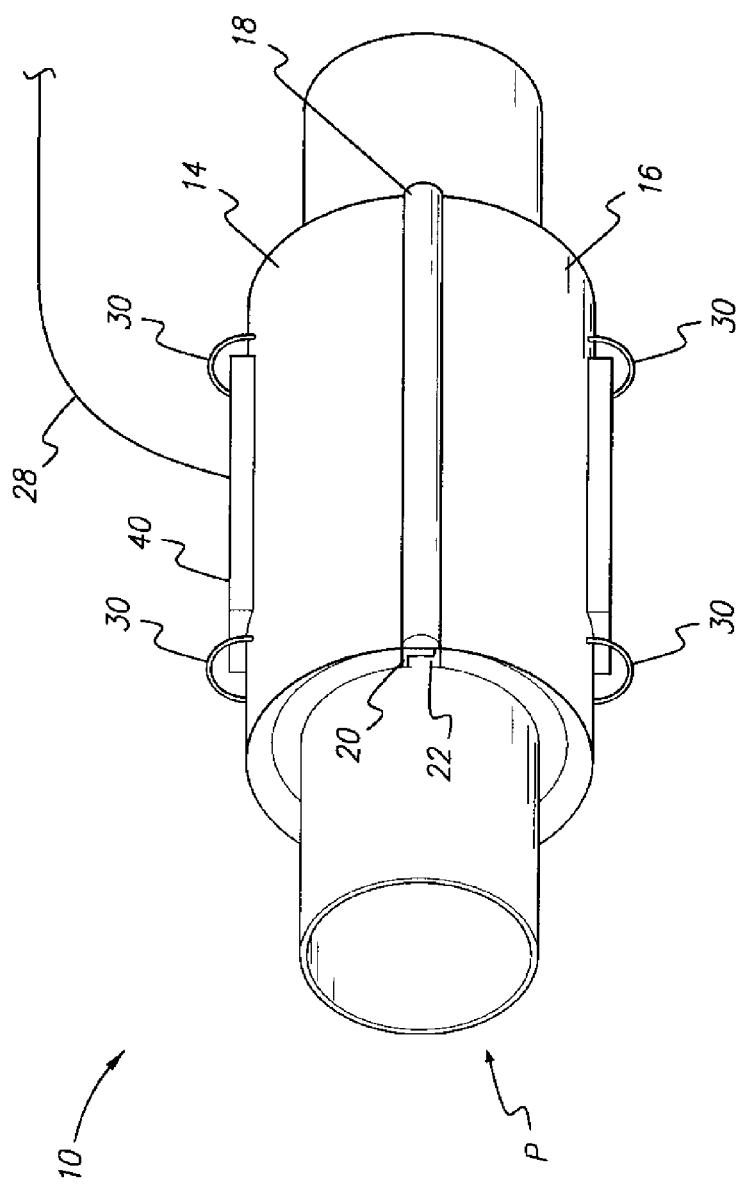
FIG. 1 is an environmental, perspective view of an acoustic leak detection system with environmental noise isolation according to the present invention.
Figure 2:
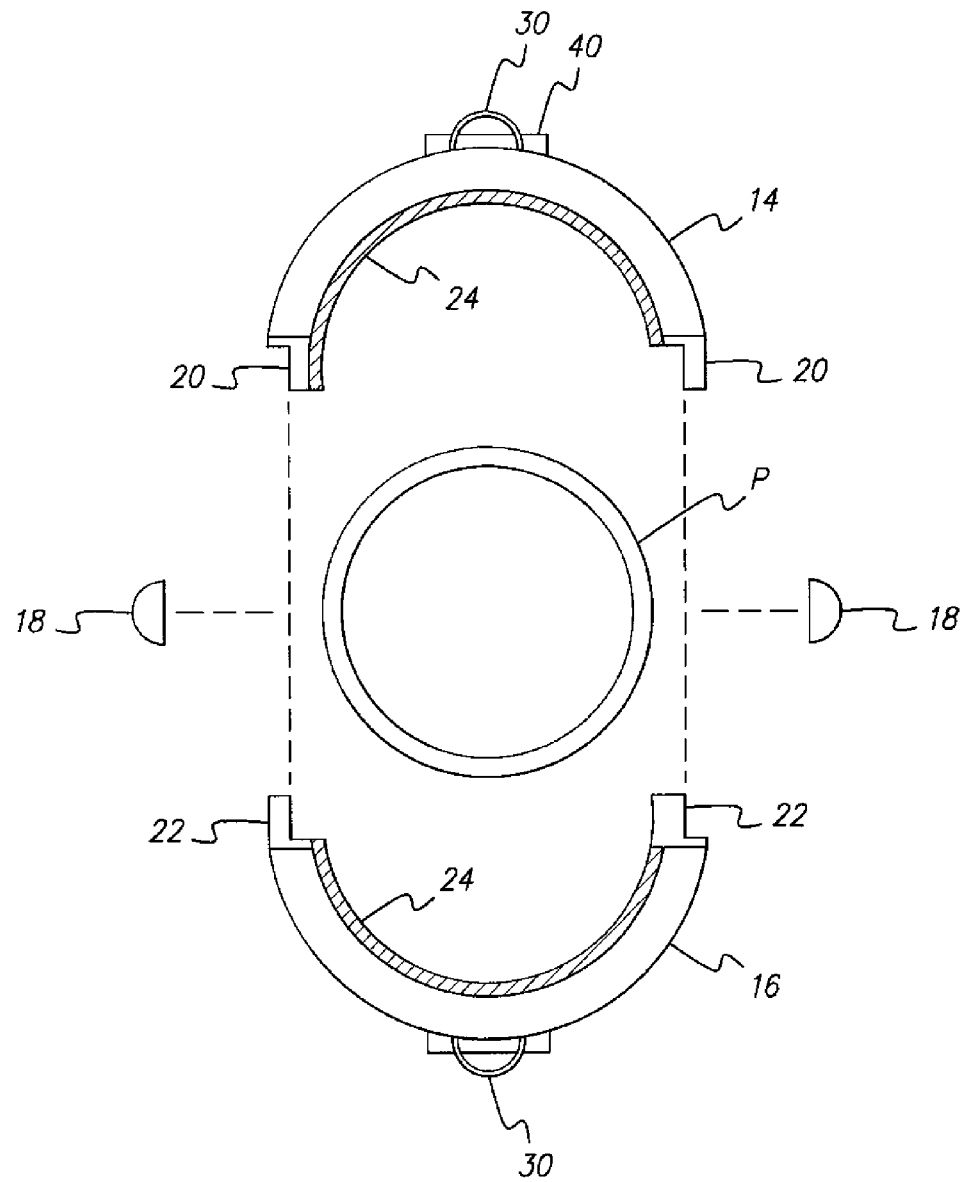
FIG. 2 is a partially exploded environmental side view of the acoustic leak detection system with environmental noise isolation according to the present invention.

Referring to FIG. 1, the acoustic leak detection system with environmental noise isolation, designated generally as 10 in the drawings, provides for the acoustic detection of leaks in a pipe P while minimizing interference from external or environmental noise that might otherwise interfere with detection of the leak. As best shown in FIGS. 1 and 2, the acoustic leak detection system 10 includes a hollow shell adapted for positioning about the pipe P to be inspected. The hollow shell preferably has first and second portions 14, 16, respectively, which are releasably secured or attached to one another. The first and second portions 14, 16 forming the hollow shell are preferably formed from an acoustically insulating material.

In FIGS. 1 and 2, the hollow shell is shown as being substantially cylindrical, the first and second portions 14, 16 each being substantially semicylindrical. It should be understood that the hollow shell may be any shape that can be fastened around the pipe or conduit, and that the cylindrical shape illustrated in FIGS. 1 and 2 is shown for exemplary purposes only.

Any suitable type of closure or fastener may be used to secure the first portion 14 to the second portion 16, although it should be understood that the first and second portions 14, 16 must be acoustically sealed to one another to prevent leakage of environmental noise. Preferably, a first pair of magnets 20 are attached to opposing edges of the first portion 14, as shown in FIG. 2, and a second pair of magnets are attached to opposing edges of the second portion 16. Alternatively, only a single pair of magnets may be provided, and the other pair of magnets may be replaced by corresponding members formed from ferromagnetic material, such as iron. As best shown in FIG. 2, the first and second pairs of magnets 20, 22 may be L-shaped in cross section, allowing for interlocking engagement to form an acoustically tight seal. Additional covers or couplers 18 may be further applied to cover the joint formed between the interlocking magnets. The cover or coupler 18 may be magnetic or may be any other suitable type of cover to form an acoustically tight seal over the joint formed between the interlocking magnets.

Figure 3:
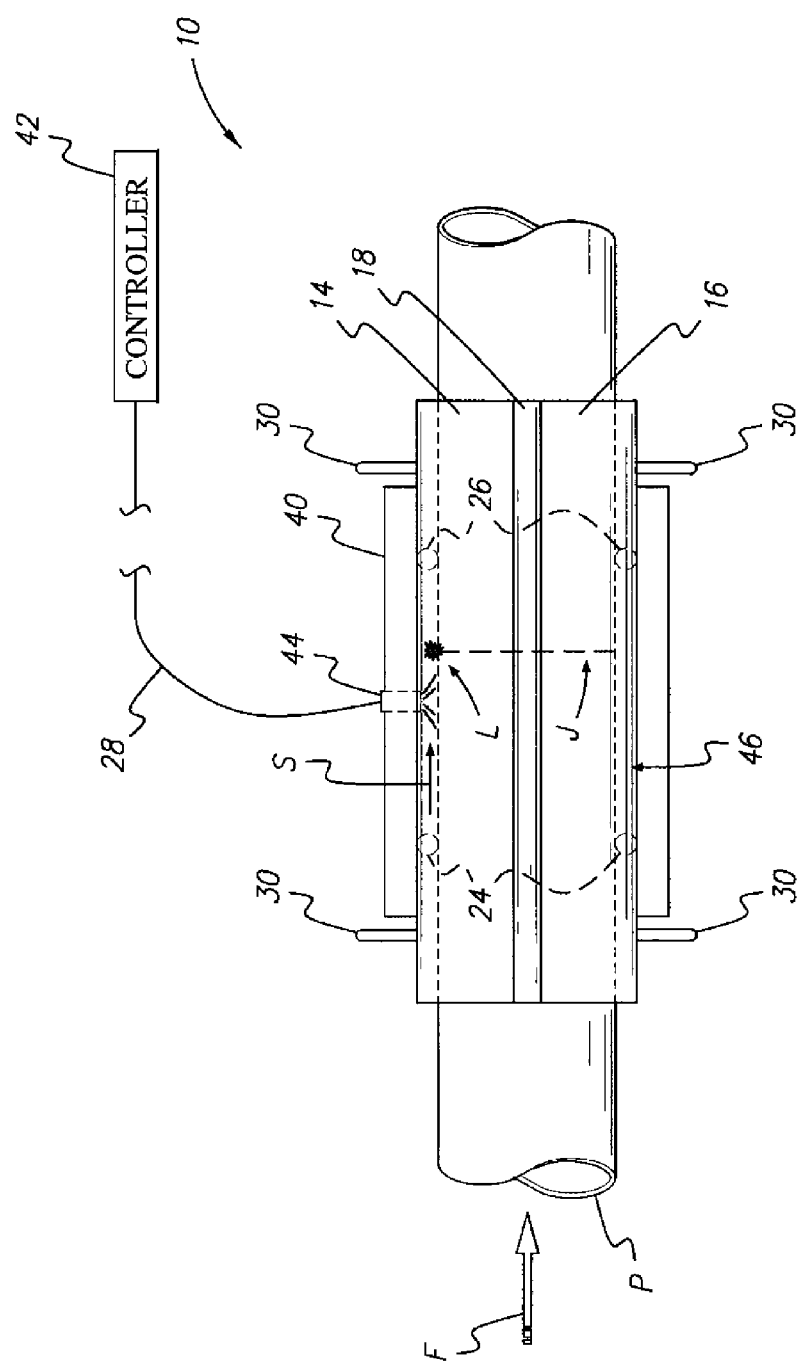
FIG. 3 is a diagrammatic side view of the acoustic leak detection system with environmental noise isolation according to the present invention.

As best shown in FIG. 3, a pair of gasket rings 24, 26 are attached to the inner surface of the hollow shell and spaced apart from one another, the gaskets 24, 26 sealing against the outer surface of the pipe P to form an acoustic chamber or acoustically isolated region 46 defined between the outer surface of the pipe P, the pair of gaskets 24, 26 and the inner surface of the hollow shell. The gaskets 24, 26 may be formed from any suitable type of resilient, acoustic insulation material. Preferably, each gasket includes first and second semicircular portions matching the dimensions and configuration of the inner surface of the first and second portions 14, 16 of the hollow shell, as shown in FIG. 2. In addition to the tight fit between gaskets 24, 26 and the outer surface of the pipe P, the system 10 may be further secured to the pipe P through the magnetic attraction between magnets 20, 22 (and coupler 18 if coupler 18 is magnetic) and the material forming the pipe P, if the pipe P is formed from a paramagnetic material. Handles or rings 30 may be attached to the outer surface of first and second portions 14, 16 of the hollow shell, allowing the user to easily separate the first and second portions 14, 16.

An acoustic sensor 44, such as a microphone or the like, is mounted on the hollow shell within the acoustically isolated region 46 for detecting any acoustic signals; i.e., the sound (the acoustic signal is indicated generally as S in FIG. 3) produced by a leak L in the pipe P within the acoustically isolated region 46 and converting the sound to a corresponding signal, which may be electrical and either analog or digital. The acoustically isolated region 46 may be defined about a pipe joint J or another area of interest that is known to be susceptible to leakage.

In addition to being acoustically insulated, the shell portions 14, 16 are further preferably formed from an acoustically reflective material (as opposed to an acoustically absorbent material), thus allowing the acoustically isolated region 46 to form a resonance or reverberation cavity for magnifying the intensity of the signal S generated by the leak L.

Following detection of the sound or acoustic signal S within the acoustically isolated region, the signal produced by the detector or sensor 44 is analyzed. It should be understood that any suitable type of acoustic detector 44 and any suitable type of signal analysis system may be utilized. As shown in FIG. 3, the acoustic detector or sensor 44 is in communication with a controller 42 via line 28, which may be either a wired or wireless connection. Acoustic sensors and acoustic signal analyzers for acoustic leak detection are known. Examples of such systems are illustrated in U.S. Pat. Nos. 5,675,506; 5,974,862; and U.S. Pat. No. 7,266,992 B2, each of which is hereby incorporated by reference in its entirety.

Figure 4:
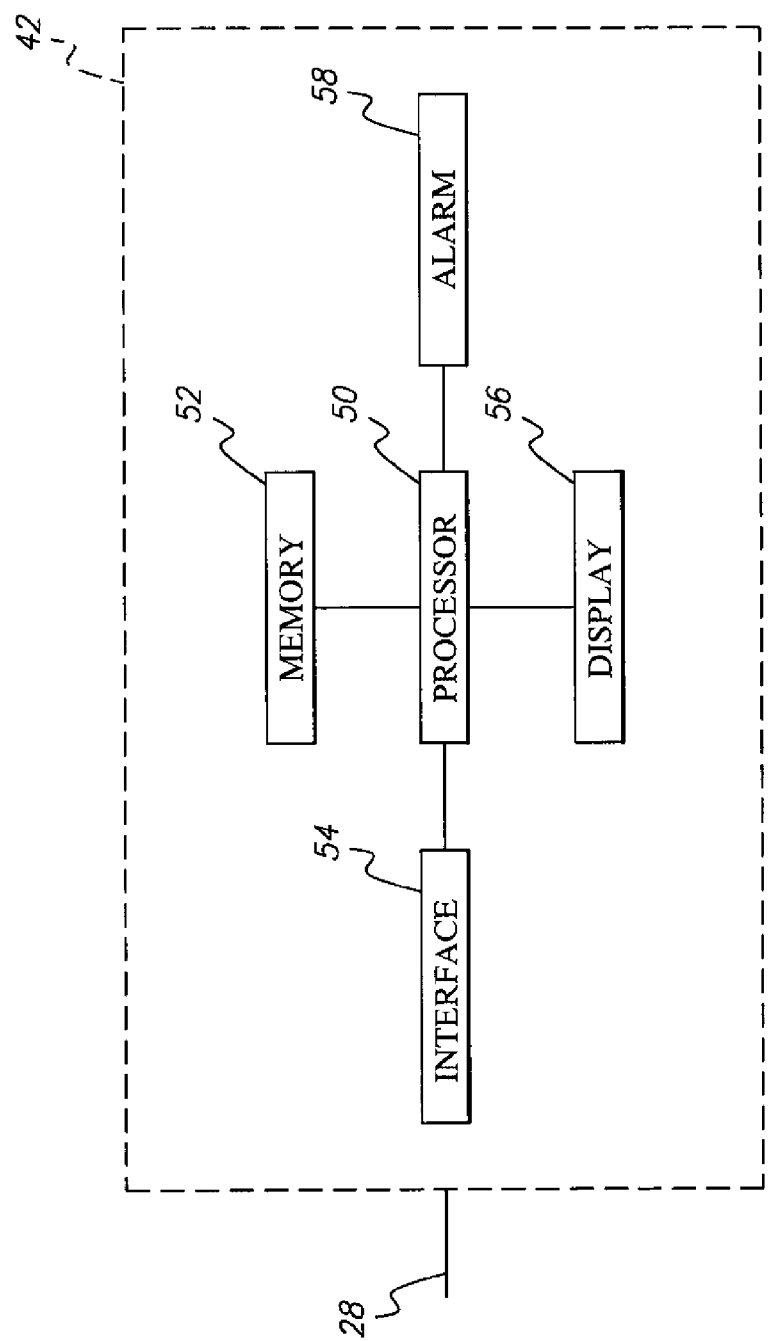
FIG. 4 is a block diagram of a controller for an acoustic leak detection system with environmental noise isolation according to the present invention.

It should be understood that the analysis and calculations may be performed by any suitable computer system or controller, such as that diagrammatically shown in FIG. 4. Data is entered into the controller 42 by any suitable type of user interface 54, along with the input signal generated by the acoustic sensor 44, and may be stored in memory 52, which may be any suitable type of computer readable and programmable memory. Calculations are performed by a processor 50, which may be any suitable type of computer processor, microprocessor, microcontroller, digital signal processor or the like, and may be displayed to the user on a display 56, which may be any suitable type of computer display.

The processor 50 may be associated with, or incorporated into, any suitable type of computing device, for example, a personal computer or a programmable logic controller. The display 56, the processor 50, the memory 52, a separate alarm 58 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 52, or in place of memory 52, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

The acoustic signal S may be recorded and saved in memory 52 and compared against a database of known acoustic signals, also recorded in memory 52, which match leakages, indicating the presence of a leak and its severity. Alternatively, the intensity of the acoustic signal S may be measured. If the intensity exceeds a threshold value stored in memory 52, the acoustic signal then indicates the presence of the leak and the intensity indicates its severity. Upon determination of the leak, an alert signal is generated, which may be visual, audible or the like. The alert signal may be displayed to the user on the display 56, which may also indicate pertinent information, such as the location and type or severity of the leak, or may be delivered to a separate alarm 58.

It should be understood that multiple such systems 10 may be applied throughout a single pipeline, such as at every joint J, thus providing a unique alarm signal associated with a particular one of the systems. This would allow the position of the leak to be indicated to maintenance and repair personnel.

It is to be understood that the present invention is not limited to the embodiments described above, but encompasses any and all embodiments within the scope of the following claims.

We claim:

1. An acoustic leak detection system with environmental noise isolation, comprising:
   a hollow shell adapted for attachment around a pipe, the hollow shell being substantially cylindrical and having an interior surface, wherein said hollow shell comprises first and second portions, each of the portions being substantially semicylindrical;
   a first pair of magnets attached to opposing edges of the first portion of the hollow shell;
   a second pair of magnets attached to opposing edges of the second portion of the hollow shell for releasably attaching the first portion to the second portion;
   a pair of gaskets attached to the inner surface of the hollow shell, the pair of gaskets being spaced apart from one another and adapted for encircling the pipe and bearing against the pipe to form an acoustically isolated region defined between the pipe, the pair of gaskets and the inner surface of the hollow shell;
   an acoustic sensor mounted within the hollow shell for detecting sound generated by a leak in the pipe within the acoustically isolated region and converting the sound to a signal;
   a controller connected to the acoustic sensor, the controller having means for analyzing the signals produced by the acoustic sensor to determine when the acoustic sensor has detected sound corresponding to a leak in the pipe within the acoustically isolated region; and an alarm connected to the controller for generating an alert signal when the analyzed signal indicates a leak in the pipe within the acoustically isolated region.

2. The acoustic leak detection system with environmental noise isolation as recited in claim 1, wherein each said magnet is substantially L-shaped.

3. An acoustic leak detection system with environmental noise isolation, comprising:
- a hollow shell adapted for attachment around a pipe, the hollow shell having an inner surface and having first and second portions releasably attached to one another;
- a first pair of magnets attached to opposing edges of the first portion of the hollow shell;
- a second pair of magnets attached to opposing edges of the second portion of the hollow shell for releasably attaching the first portion to the second portion;
- a pair of gaskets attached to the inner surface of the hollow shell, the pair of gaskets being spaced apart from one another and adapted for encircling the pipe and bearing against the pipe to form an acoustically isolated region defined between the pipe, the pair of gaskets and the inner surface of the hollow shell;
- an acoustic sensor mounted within the hollow shell for detecting sound generated by a leak in the pipe within the acoustically isolated region and converting the sound to a signal;
- a controller connected to the acoustic sensor, the controller having means for analyzing the signals produced by the acoustic sensor to determine when the acoustic sensor has detected sound corresponding to a leak in the pipe within the acoustically isolated region; and
- an alarm connected to the controller for generating an alert signal when the analyzed signal indicates a leak in the pipe within the acoustically isolated region.

4. The acoustic leak detection system with environmental noise isolation as recited in claim 3, wherein each said magnet is substantially L-shaped.

5. The acoustic leak detection system with environmental noise isolation as recited in claim 3, wherein said hollow shell is substantially cylindrical.

6. The acoustic leak detection system with environmental noise isolation as recited in claim 5, wherein each of said first and second portions is substantially semicylindrical.

7. The acoustic leak detection system with environmental noise isolation as recited in claim 6, wherein each said gasket has first and second portions, the first portion of said gasket being attached to the first portion of said hollow shell, the second portion of said gasket being attached to the second portion of said hollow shell.

8. The acoustic leak detection system with environmental noise isolation as recited in claim 7, wherein the first and second portions of said pair of gaskets is each substantially semicircular.

9. The acoustic leak detection system with environmental noise isolation as recited in claim 8, wherein the first and second portions of said hollow shell are each formed from acoustic insulation material.

10. The acoustic leak detection system with environmental noise isolation as recited in claim 9, wherein the first and second portions of said hollow shell are each formed from an acoustically reflective material.

11. The acoustic leak detection system with environmental noise isolation as recited in claim 10, wherein each said gasket is formed from acoustic insulation material.

12. The acoustic leak detection system with environmental noise isolation as recited in claim 11, wherein each said gasket is formed from a resilient material.

13. The acoustic leak detection system with environmental noise isolation as recited in claim 3, further comprising first and second handles mounted on the first and second portions of said hollow shell.

* * * * *